United States Patent [19]
Williams

[11] Patent Number: 4,733,898
[45] Date of Patent: Mar. 29, 1988

[54] PICKUP-BED SECURE STORAGE UNIT

[76] Inventor: Scottie D. Williams, P.O. Box 927, Abilene, Tex. 79604

[21] Appl. No.: 23,615

[22] Filed: Mar. 9, 1987

[51] Int. Cl.⁴ .............................................. B62D 33/04
[52] U.S. Cl. .................. 296/24 R; 296/37.6; 296/39 R; 224/42.42
[58] Field of Search .................. 296/37.6, 39 R, 24 R; 224/42.42 R

[56] References Cited

U.S. PATENT DOCUMENTS

| | | | |
|---|---|---|---|
| 2,784,027 | 3/1957 | Temp | 296/23 |
| 2,788,137 | 4/1957 | Harkness | 214/83.24 |
| 3,727,971 | 4/1973 | Sisler | 296/37 |
| 4,103,956 | 8/1978 | Faulstich | 296/24 R |
| 4,111,481 | 9/1978 | Nix et al. | 296/39 R |
| 4,394,100 | 7/1983 | Sperlich | 296/37.6 |
| 4,469,364 | 9/1984 | Rafi-Zadeh | 296/37.6 |
| 4,573,731 | 3/1986 | Knaack | 296/376 |

Primary Examiner—Robert R. Song
Attorney, Agent, or Firm—Dennis T. Griggs

[57] ABSTRACT

A combination storage unit/auxillary bed liner assembly is adapted for nesting engagement onto the bed of a pickup truck. The storage unit covers the entire open area of the pickup bed, with the space between the auxillary bed liner and the truck bed being partitioned to provide multiple storage compartments. A top-opening auxillary storage compartment is formed on each side of the two rear wheel well regions. Two pull-out drawers are received within adjoining central compartments and extend substantially the entire length of the truck bed. The pull-out drawers provide secure storage compartments for tools and equipment, and also serve as work tables. The auxillary cargo deck liner is supported by interior side panels, a central partition and engagement of saddle/bridge deck portions onto wheel well flanges.

5 Claims, 6 Drawing Figures

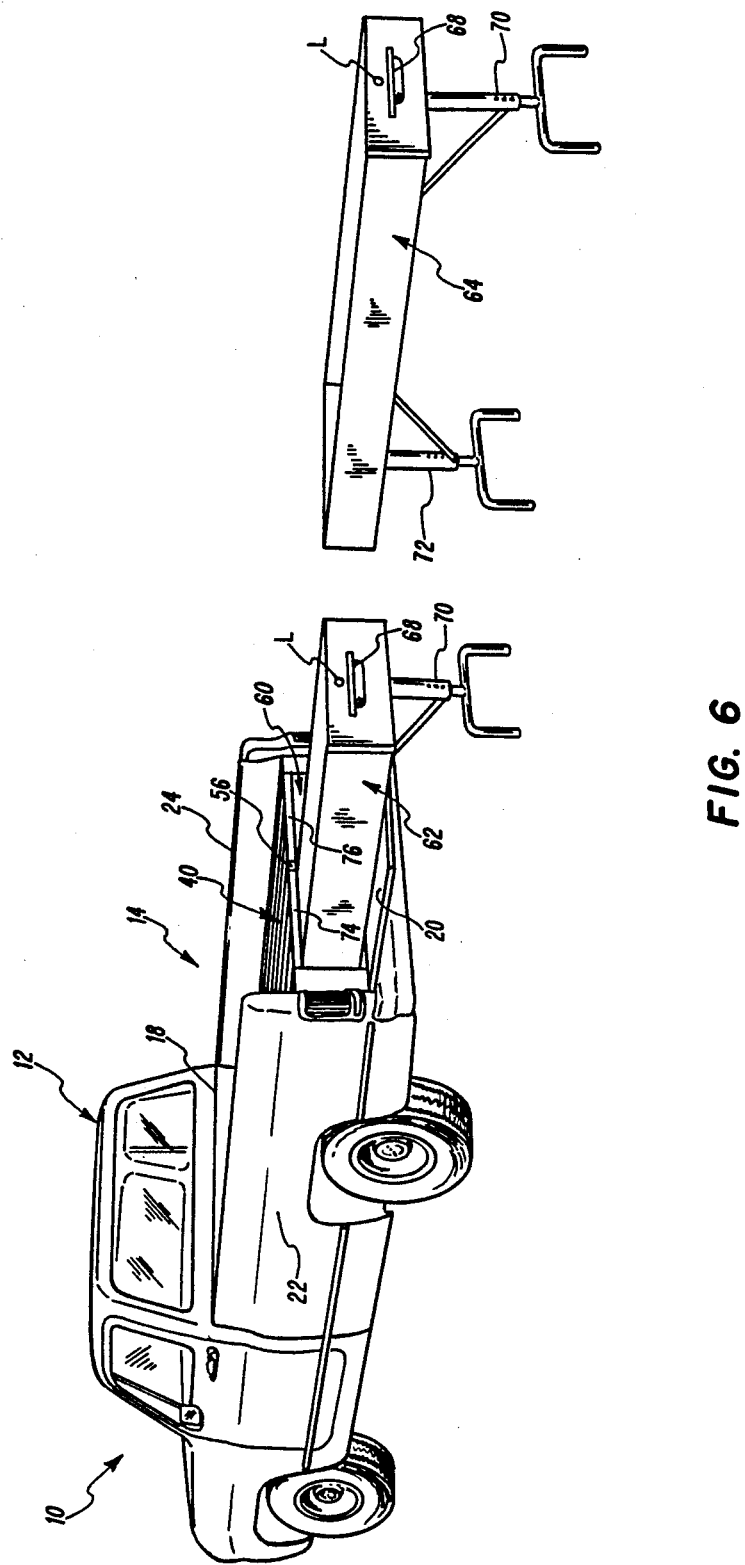

PICKUP-BED SECURE STORAGE UNIT

FIELD OF THE INVENTION

This invention relates generally to storage units which are adapted for use in combination with the load bed of a pickup truck.

BACKGROUND OF THE INVENTION

The cargo-carrying area of a pickup truck is commonly referred to as the truck "bed". Cargo space for carrying tools and other valuables may not be fully utilized because of the need to keep the truck bed clear to accommodate oversized equipment and construction materials.

Contractors, cabinet makers, electricians, plumbers and other skilled tradesmen perform on-site construction and use pickup trucks to transport tools and materials to construction sites. The normal work set-up requires loading of tools and materials at a shop and unloading them at a work site, and setting up work tables and tools. At the end of the work day, the tools and equipment must be reloaded or, alternatively, left set-up at an unsecured and unguarded construction site.

DESCRIPTION OF THE PRIOR ART

It is known to provide storage units for securing small items such as tools, materials and the like onto the bed of a pickup truck. Such storage units are mounted onto or along the side walls of the truck bed and take up cargo space which would otherwise be used for tools, materials and equipment.

Presently, conventional tool storage boxes are approximately the size and shape of a steamer trunk and are installed at a forward location on the truck bed just behind the cab. Such storage boxes reduces the effective length of the pickup bed by the width of the box. Most are not water-tight or rust proof and are difficult to secure against theft.

Many contractors and craftsmen, finding such tool boxes to be inadequate, have adapted camper shells for attachment to the pickup bed for securing equipment and tools. Others have attempted to secure their tools and equipment by a sliding tonneau cover which attaches onto the sidewalls of the pickup beds.

Some limitations of the commercially-available pickup bed tool boxes are as follows: conventional tool boxes when mounted onto the bed of a pickup are conspicuous and accessible to unauthorized persons; an "across-the-bed" tool box decreases the length of the bed by the depth of the tool box; long, narrow tool boxes installed along the sidewalls of a pickup bed decrease the width of the bed; the "across-the-bed" tool box has limited storage capacity with the result that tools must be mixed or otherwise stored on top of each other; the "sidewall" tool boxes are narrow and therefore limit the type of tools or parts that can be stored; the presence of tool boxes which extend across the bed or along the length of the bed substantially reduce the load-carrying capability of the pickup bed; tools that are in the center or on the bottom of the tool box are difficult to reach and remove; the locking system for such tool boxes is easily snapped open with a pry bar; such tool boxes can easily be removed if not bolted to the body of the pickup truck; and, the presence of tool boxes which extend across the bed interfere with the placement and mounting of portable covering enclosures such as a canopy, camper shell or the like.

OBJECTS OF THE INVENTION

It is, therefore, the principal object of the present invention to provide a secure storage unit for mounting onto a pickup truck bed, for use by contractors, carpenters, cabinet makers, electricians, plumbers and other craftsmen who must perform their trade at work sites and who now use conventional tool boxes and pickups for transport.

A related object of the invention is to provide a storage facility for mounting onto a pickup truck bed which does not reduce the floor space of the truck bed, so that cargo capacity is unaffected.

Another object of this invention is to provide a secure and spacious storage unit for fitting onto the bed of a pickup truck which can accomodate equipment, supplies and construction materials having a length comparable to the length of the pickup truck bed.

Yet another object of this invention is to provide a secure and spacious storage unit for mounting onto the bed of a pickup truck which does not otherwise affect the normal uses of the pickup bed such as cargo hauling capability and attachment of a camper shell.

Still another object of this invention is to provide a secure and spacious storage unit for use with a pickup truck, with the storage unit being concealed when the tailgate is closed, and with the top of the storage unit appearing to be the floor of the pickup load bed.

SUMMARY OF THE INVENTION

The foregoing objects are accomplished according to the present invention wherein a combination storage unit/pickup bed liner is fitted snugly onto the bed of a pickup truck. The storage unit covers the unit open area of the pickup bed, raising the bed by the height of the unit itself, approximately twelve inches.

The space between the auxillary bed liner and the truck bed is partitioned to provide multiple storage compartments. According to the preferred embodiment, four top-opening auxillary storage compartments are formed on each side of the two rear wheel wells. Additionally, two pull-out drawers are received within adjoining central compartments and extend substantially the entire length of the truck bed. The two pull-out drawers serve as work tables as well as secure storage compartments for tools, equipment and materials up to approximately eight feet in length. Each pull-out drawer includes a detachable lid which provides a work surface. When the pull-out drawers are used as work tables, they are supported by foldable, telescoping legs that are adjustable to provide variable working height.

In contrast with prior art tool boxes, the combination storage unit/pickup-bed liner does not interfere with the use of the pickup bed for cargo handling. That is, the floor space of the load bed is not sacrificed, since the auxillary, elevated bed liner provides the same load-supporting surface area as the underlying truck bed liner. Moreover, cargo can be loaded as desired on top of the auxillary bed liner and does not obstruct access to the pull-out drawers of the unit. Additionally, it does not interfere with the use of portable coverings such as camper shells.

Other objects and advantages of the present invention will be appreciated by those skilled in the art upon reading the detailed description which follows with reference to the attached drawings.

DETAILED DESCRIPTION OF THE PREFERRED EMBODIMENT

In the description which follows, like parts are marked throughout the specification and drawings, respectively. The drawings are not necessarily to scale and in some instances proportions have been exaggerated in order to mroe clearly depict certain features of the invention.

Figure 1:
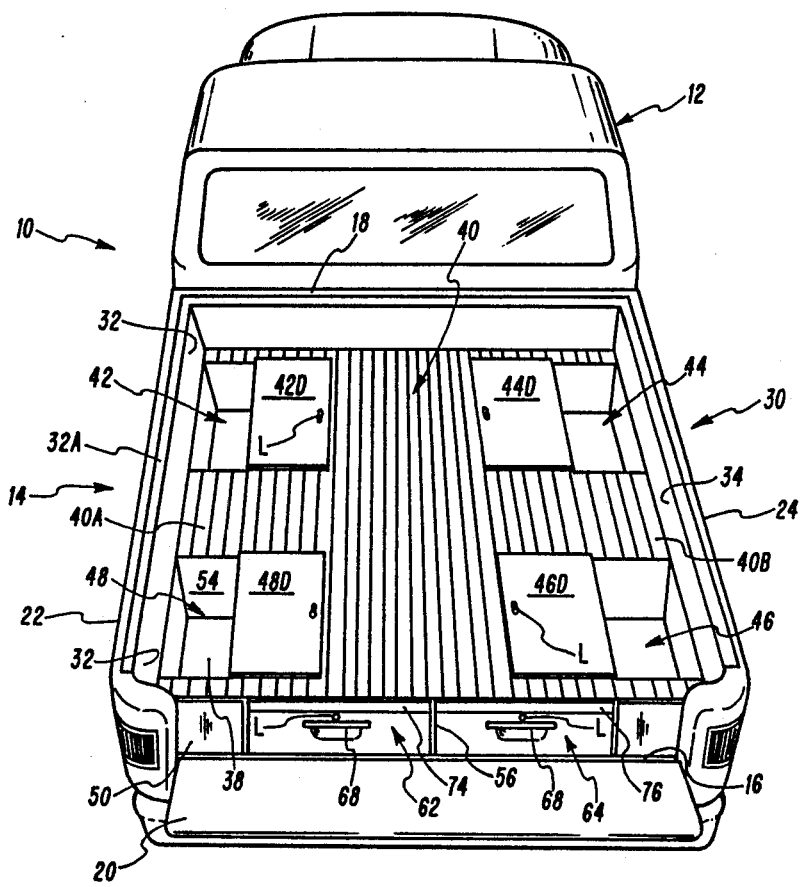
FIG. 1 is a top perspective view of a pickup truck bed in which the combination bed liner and secure storage unit is installed.
Figure 4:
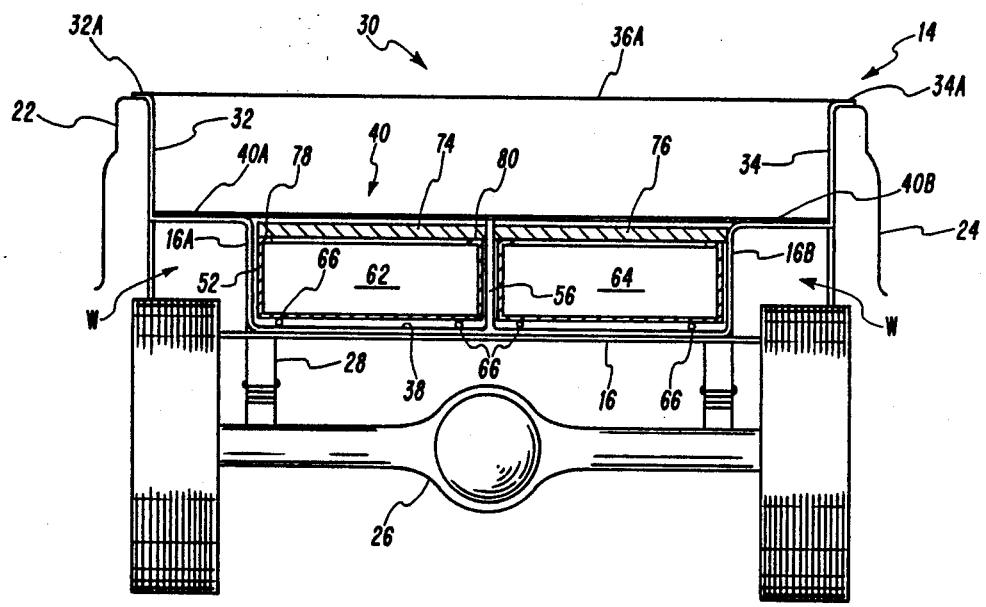
FIG. 4 is a view, partly in cross section and partly in elevation, taken along the lines IV—IV of FIG. 5.

Referring to FIG. 1, a conventional pickup truck 10 includes a cab 12 and a cargo area 14 extending immediately behind the cab. The cargo area 14 is framed by a flat, rectangular bed 16, a front wall 18, a rear tailgate 20, and opposite side walls 22, 24 extending upright from bottom bed 16. The tailgate 20 is hinged for downward swingable movement relative to the rear end of the load bed 16. The load bed 16 defines a rectangular load area which is supported from a rear axle 26 by leaf springs 28 (FIG. 4).

Figure 2:
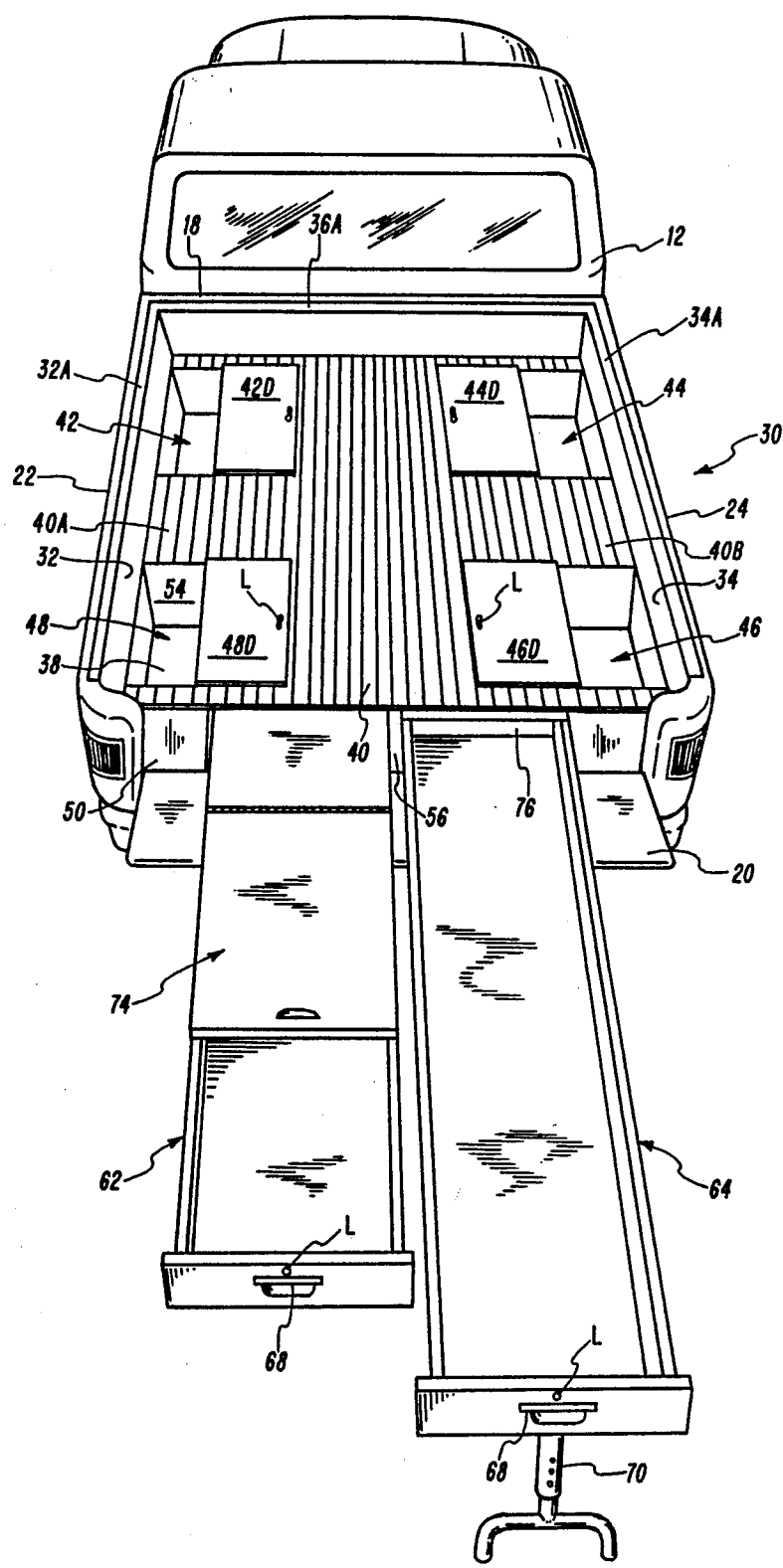
FIG. 2 is a top perspective view similar to FIG. 1 in which the pull-out storage drawers are shown in an extended position.
Figure 3:
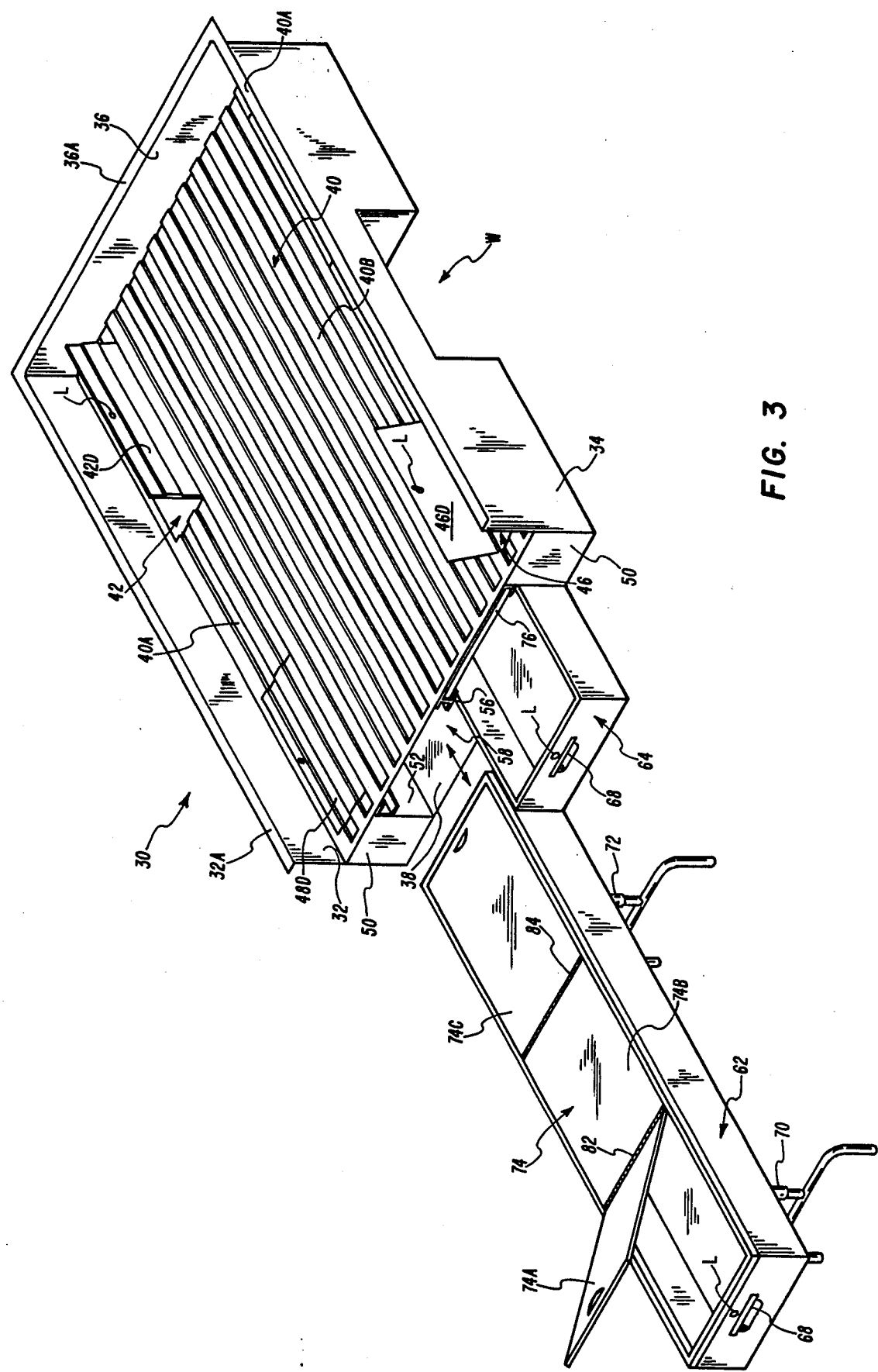
FIG. 3 is a perspective view of the combination bed liner and secure storage unit in which one pull-out drawer has been completely removed and set up for use as a work table.

Referring now to FIGS. 1, 2 and 3, a combination storage unit/pickup bed liner assembly 30 is received in nesting engagement within the cargo space 14. The storage/liner assembly 30 is preferably made of a polymer material such as polyethylene. Moldable polymer materials are preferred which have high impact resistance, durability and resistance to chemical spills. The combination storage/linear assembly 30 is preferably molded by a conventional thermoforming process in which the partitions, panels and bed liner are integrally formed.

Referring now to FIG. 3, the combination storage/liner assembly 30 is provided with a left side panel 32, a right side panel 34, a forward end panel 36, a bottom panel 38, and an auxillary load bed liner panel 40. The auxillary load bed panel 40 is vertically spaced from and extends in parallel with the bottom panel 38. Both the bottom panel 38 and the auxillary load bed liner panel 40 are substantially coextensive with the pickup bed 16.

According to an important feature of the invention, the side panels 32, 34 and the end panel 36 are dimensioned for nesting fit within the cargo space 14. That is, the side panels 32, 34 have a vertical dimension which is substantially equal to the corresponding vertical height of the truck bed side panels 22, 24. Moreover, the side panels 32, 34, 36 are provided with flange portions 32A, 34A and 36A, respectively, which overlap and rest on top of the truck bed side panels 18, 22 and 24, respectively. Accordingly to this arrangement, the bottom panel 38 rests in surface-to-surface engagement with the pickup bed 16, and the flange portions 32A, 34A and 36A ride on the top surface portions of the truck bed side panels.

Thus, the combination storage/liner assembly 30 is stabilized against lateral shifting within the cargo space 14. When unloaded, the combination storage/liner assembly 30 can be easily placed into or removed from the cargo space 14. Although the combination storage/liner assembly 30 can be bolted onto the pickup truck bed 16 if desired, the weight of cargo/tools contained in the auxillary load bed panel 40 will in most cases maintain the assembly 30 within the cargo space, particularly when the tailgate 20 is in the closed position as shown in FIG. 5.

The space between the auxillary bed panel 40 and the bottom panel 38 is partitioned to provide multiple storage compartments. According to the preferred embodiment, four top opening auxillary storage compartments 42, 44, 46 and 48 are formed on each side of the rear wheel well region W. Access to the top-opening compartments is provided by hinged access doors 42D, 44D, 46D and 48D, respectively.

Figure 5:
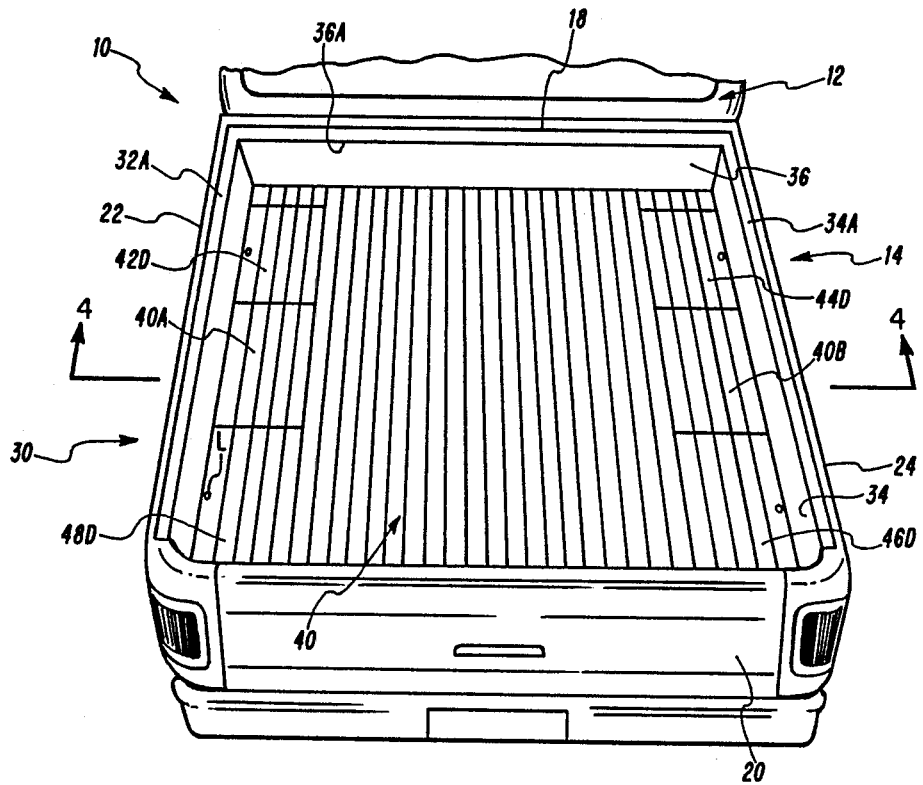
FIG. 5 is a top perspective view of a pickup truck bed which illustrates the appearance of the auxillary bed liner when secured and made ready for cargo handling; and, FIG. 6 is a perspective view of a pickup truck which has been fitted with the combination secure storage unit/bed liner combination, with the pull-out drawers being extended for use at a work site.

The hinged access doors have key-operated locks L for securing the access doors in the closed, locked position as shown in FIG. 5. The auxillary storage compartments can be used as tool/parts bins. Additionally, a thermally-insulated insert can be fitted within one or more of the storage compartments if desired, for cold storage service for carrying ice, water, beverages and perishable food items.

The top-opening auxillary storage compartments are water-tight and are sealed independently of each other. For example, the auxillary storage compartment 48 is enclosed by bottom panel 38, end panel 50, interior side panel 52 and interior end panel 54. The other auxillary compartments are likewise sealed by integrally-formed side and end panels. According to this arrangement, tools and other valuables can be secured and stored separately.

The interior end panels slope appropriately to conform with the rear wheel well regions W. As can best be seen in FIG. 4, the wheel well regions W are formed by sheet metal extensions 16A, 16B of the pickup bed 16. In this arrangement, the auxillary load bed liner panel 40 is received in overlapping, surface-to-surface engagement with the wheel well flange members 16A, 16B.

Bridging portions 40A, 40B of the auxillary load bed panel 40 act in combination with the interior end panels 54 to form saddles which ride on top of the wheel well flange portions 16A, 16B, respectively. This further stabilizes the storage/liner assembly 30 within the cargo space 14. This arrangement also strengthens the subjacent support for the auxillary load bed panel.

The space intermediate the side panels, the bottom panel and the auxillary load bed panel is divided by a central partition panel 56 which extends in right angle relation along the length of the truck bed. The central partition 56 separates adjoining pockets 58 (FIG. 3), 60 (FIG. 6). According to an important feature of the invention, pull-out drawers 62, 64 are received within the adjoining central compartments 58, 60, respectively. The pull-out drawers extend substantially the entire length of the truck bed, and collectively extend over approximately 80% of the width of the truck bed.

The pull-out drawers 62, 64 are separated by the central partition 56 and are equipped with rollers 66 which facilitate the insertion and withdrawal of the drawers into and out of the pockets. For this purpose, each drawer is equipped with a pull handle 68. Additionally, each pull drawer includes a key-operated lock L for securing the pull drawers in the closed position as shown in FIG. 1.

Each pull drawer 62, 64 is rectangular in profile and is constructed of a strong, lightweight material such as wood or aluminum. Alternatively, drawers 62, 64 can be molded of the same polymer material as used to construct the liner assembly 30.

The interior side panels, end panels and the central partition 56 provide subjacent support for the auxillary load bed liner panel 30 so that the pickup truck can be used for normal cargo loads. Cargo loading is also distributed along the areas of surface-to-surface engagement at the union of the liner flanges 32A, 34A and 36A with the truck bed side panels 18, 22 and 24, and engagement of the saddle/bridge liner portions 40A, 40B with the wheel well flange portions 16A, 16B, respectively.

Referring now to FIGS. 2, 4 and 6, the pull-out drawers 62, 64 can be partially extended or completely removed from their pockets to provide access to tools, equipment and the like. Upright support is provided by a pair of foldable, telescoping support legs 70, 72. Referring to FIGS. 2 and 6, the drawers may be partially extended, with support being provided by the tailgate 20 and by a single leg 70. The vertical height of each support leg 70 is adjustable to accom-modate a range of support positions.

The support leg 70 is preferably received in threaded engagement with a threaded fitting mounted in the bottom of the pull drawer, and is attached after the drawer has been partially extended as shown in FIG. 6. The support leg 70 is stabilized by a transverse brace 72 which extends from the support leg 70 to the under side of the pull drawer. Alternatively, the support legs may be permanently attached to the under side of the pull drawer and are hinged for folding movement into a recessed pocket on the under side of the pull-out drawer.

According to an important feature of the invention, the auxillary load bed liner panel 40 is further stabilized by work panels 74, 76 which are substantially coextensive with the length and width of each pull-out drawer. The panels 74, 76 serve as work surfaces on top of the pull drawers when they are removed from the pockets. As can best be seen in FIG. 4, the work panels 74, 76 are received within opposite, rectangular channel strips 78, 80 which are integrally formed with the liner 40, the interior side panel 52 and the central partition 56.

In the fully inserted position as shown in FIGS. 1 and 4, the work panels 74, 76 lie directly beneath the auxillary load bed liner panel 40. By this arrangement, the work panels are isolated from the loading effect of cargo placed on top of the auxillary load bed panel 40, with the cargo loading being distributed to the truck bed substantially uniformly through the sadedle/bridge portions, the interior side panels and the central partition. The pull-out drawers are dimensioned appropriately to provide a clearance between the channel flange portions 78, 80, so that the pressure of cargo loads will be applied through the side panels and the central partition, thereby permitting the pull-out drawers to be freely inserted or removed without binding.

Referring again to FIGS. 2 and 6, the pull-out drawers 62, 64 can be set up separately as work tables, either partially supported by the truck bed, or completely removed from the truck bed as illustrated in FIG. 6. It will be appreciated that the partially-extended set-up as shown in FIG. 6 is stable and provides a convenient work table, particularly when the work panel 74 is pulled out from the pocket 58 and onto the top of the drawer. It would be appreciated that when one of the pull-out drawers such as drawer 64 is completely removed from its pocket and set up, that further stabilization may be required, but a larger work surface and complete access is provided in such an arrangement.

Additionally, because of their portability, the pull-out drawers can be completely removed and set up inside a building or other construction site at a location remote from the pickup truck 10. The top-opening compartments can be locked and secured independently of the pull-out drawers. When one pull-out drawer is completely removed, the other pull-out drawer can be completely secured by the key-operated lock L and by locking the tailgate 20 in the closed position as shown in FIG. 5.

Referring again to FIG. 3, the work panel 74 includes articulated sections 74A, 74B and 74C. The end panels 74A, 74C are joined to the central panel 74B by hinges 82, 84, respectively. According to this arrangement, the end work panels 74A, 74C can be opened independently of the center work panel 74B, thereby providing access to tools or other equipment inside the pull drawer.

It will be seen that the foregoing storage/liner assembly 30 provides a secure storage unit for mounting onto the bed of a pickup truck, for use by contractors, carpenters, cabinet makers, electricians, plumbers and other craftsmen who perform their trades at work sites and require secure storage for tools and valuables as well as cargo deck space for carrying building materials and the like. The storage/liner assembly 30 provides the same cargo deck space without reducing cargo handling capacity. Because the auxillary load bed liner panel 40 is coextensive with the underlying pickup bed, it can accommodate equipment, supplies and construction materials having a length comparable to the length of the pickup truck bed.

The underlying support provided by the interior side panels, central partition and saddle/bridging arrangement allows normal cargo loads to be carried on the auxillary load bed panel 40, without interfering with normal cargo hauling capability. Because the storage/-liner assembly 30 lies below the side panels of the truck bed, it does not interfere with the attachment of a camper shell, canopy, tunneau cover and the like.

When the tailgate is closed and the access panels are closed, the storage unit is concealed, with the liner top appearing to be the floor of the pickup load bed. Thus the storage/liner assembly 30 does not invite the attention of unauthorized persons. Unlike conventional tool boxes, the combination storage/liner assembly of the invention does not impair the cargo-handling capability of the pickup bed. Since it does not reduce the floor space of the bed, cargo handling is largely unaffected. Presence of cargo on top of the auxillary liner does not limit access to the pull drawers of the unit. In the preferred embodiment, the storage unit/liner assembly is integrally molded of a lightweight, durable polymer material which is water-tight and rust-free. It has high impact resistance, is easy to clear and is resistant to exposure to corrosive chemicals, salt spray and the like.

It will be appreciated that the combination storage/liner assembly can be used to good advantage for recreational purposes. For example, clothes and other personal items can be conveniently carried in the pull-out drawers. Fishing tackle, life jackets, hunting rifles and camping gear can also be secured in the water-proof compartments. Because the pull-out drawers extend substantially the entire length of the truck bed, oversized fishing equipment such as fly fishing rods can be secured without disassembly. Additionally, clothing items can be stored in the pull-out drawers in such a manner that they will not become wrinkled. Finally, the pull-out drawers in combination with the work panels can serve as a convenient picnic table, as desired.

A preferred embodiment of the invention has now been described in detail. Since changes and modifications to the above preferred embodiment may be made without departing from the spirit of the invention, the scope of the invention is not to be limited to the foregoing details, except as set forth in the appended claims.

What is claimed is:

1. A combination storage unit and liner assembly for mounting onto the bed of a pickup tuck in nesting engagement with the side panels and end panel of the truck bed comprising a bottom panel for engaging the load-bearing surface of the truck bed, first and second side panels extending upright from said bottom panel, each side panel having a flange portion extending transversely with respect to the side panel for engaging the top surface of one of the truck bed side panels, an auxillary load bed panel being vertically spaced with respect to said bottom panel and extending substantially in parallel relation therewith, a plurality of inner panels extending vertically between the bottom panel and the auxillary load bed panel, said inner panels partitioning the space between the bottom panel and auxillary load bed panel thereby defining a pocket; a pull drawer being disposed within said pocket and being movable into and out of said pocket.

2. A combination storage and liner assembly as defined in claim 1, including a work panel slidably received within said pocket, said work panel being substantially coextensive with said pull drawer.

3. A combination storage unit and liner assembly as defined in claim w, said work panel comprising a first panel portion and a second panel portion, said panel portions being joined by a hinge.

4. A combination storage and liner assembly as defined in claim 1, said truck bed having wheel well structure, said inner panels partitioning said space to define one or more top-opening compartments in the regions immediately forward and to the rear of the wheel well structure, said auxillary load bed liner panel including one or more door portions movably connected to said bed liner panel for selectively restricting access to said compartments.

5. A combination storage unit and liner assembly as defined in claim 1, said space between said bottom panel and the auxillary load bed liner panel being divided by a central partition panel, said central partition panel extending vertically between the bottom panel and the auxillary load bed panel, thereby dividing said space into first and second pockets, with a first pull drawer being received in the first pocket and second pull drawer being received in the second pocket, in side-by-side relation.

* * * * *

UNITED STATES PATENT AND TRADEMARK OFFICE
CERTIFICATE OF CORRECTION

PATENT NO. : 4,733,898
DATED : March 29, 1988
INVENTOR(S) : Scottie D. Williams

It is certified that error appears in the above-identified patent and that said Letters Patent is hereby corrected as shown below:

Column 1, line 37, "reduces" should be -- reduce --.

Column 3, line 30, "mroe" should be -- more --.

Column 8, line 11, "w" should be -- 2 --.

Signed and Sealed this

Sixteenth Day of August, 1988

Attest:

DONALD J. QUIGG

Attesting Officer

Commissioner of Patents and Trademarks